United States Patent Office 3,535,257
Patented Oct. 20, 1970

3,535,257
STABILIZATION OF OLEFIN POLYMERS AGAINST COPPER-INDUCED DEGRADATION
Abraham Kutner, Wilmington, Del., assignor to Hercules Incorporated, Wilmington, Del., a corporation of Delaware
No Drawing. Filed Aug. 4, 1967, Ser. No. 658,354
Int. Cl. C08f 45/56
U.S. Cl. 260—45.75      4 Claims

ABSTRACT OF THE DISCLOSURE

Crystallizable α-olefin polymers and copolymers are stabilized against copper-induced degradation by incorporating therein minor amounts of zinc sulfide in presence of specified phenolic antioxidants and sulfur compounds.

---

This invention relates to olefin polymer compositions suitable for use as coating materials for copper or copper-containing articles.

It is known that olefin polymers such as stereoregular polypropylene undergo rapid oxidative degradation and become brittle and useless when in the presence of copper, particularly at elevated temperatures. This degradation does not appear to be prevented by even the best stabilizer-antioxidant systems known in the art. Since these polymers otherwise have excellent mechanical and electrical properties which make them excellent candidates for such uses as electrical wire insulation, electrical condensers, and moldings with copper inserts, the art has found it necessary to seek out ways to prevent this degradation.

The most likely method for preventing copper-induced degradation is by the addition of a copper antagonist thereto and several such additives have been disclosed by the prior art; for example, U.S. 3,239,484 teaches the use of oxanilide in conjunction with a crotonaldehyde-phenol condensation product to retard metal induced degradation. U.S. 3,181,971 teaches use of certain aliphatic and aromatic amines having boiling points greater than about 200° C. in combination with phenolic antioxidants and an organic compound containing divalent sulfur. U.S. 3,296,188 teaches the use of hydrazone compounds containing as a substituent a six membered heterocyclic nitrogen radical, a phenol and, optionally, an organic sulfur compound.

The additives disclosed by the prior art for improving resistance to copper induced degradation perform effectively but are subject to other objections. For example, oxanilide is difficult to disperse uniformly in the polymer and affects electrical properties adversely. The hydrazones are not usually available commercially in quantity and are thus quite expensive.

Now in accordance with this invention it has been found that the oxidation stability of stereoregular polyolefins in the presence of copper can be substantially increased by the addition thereto of a specified amount of zinc sulfide. More specifically the invention is a composition which exhibits good resistance to oxidative degradation in the presence of copper comprising an olefin polymer containing, based on the weight of the polymer, about 0.1 to 5% zinc sulfide, about 0.01 to 2% of a phenolic antioxidant, and about 0.01 to 2% of an organic sulfur-containing compound. The preferred ranges of these additives are about 0.25 to 2% zinc sulfide, about 0.1 to 0.5% phenolic antioxidant, and about 0.1 to 0.5% organic sulfur compound.

Zinc sulfide shows a number of advantages over copper antagonists disclosed in the art. It is not volatile under the conditions of use, shows no tendency to exude from the polymer, and its presence in the polymer does not adversely affect electrical properties. Additionally, it is readily available in carload lots at a very low price. It has been found to disperse well in the polymer even though it is not soluble therein.

The problem of copper induced degradation is encountered by all olefin polymers having tertiary carbon atoms. This includes virtually all olefin polymers made by conventional commercial methods. The invention is applicable to polymers of olefins having 2 to 6 carbon atoms and to copolymers of one of these olefins with a minor portion of another. Thus they include polyethylene, polypropylene, poly(butene-1), poly(3-methyl butene-1), and crystalline copolymers thereof. In particular, the invention is applicable to homopolymers of propylene and those copolymers containing up to about 25% ethylene which are still predominantly crystalline. These can be either of the random (statistical) type or the so-called block copolymers.

The other ingredients which are included in the composition according to this invention are known phenolic antioxidants and light stabilizers.

Although a large number of phenolic compounds are known to the art, the invention has been found to be particularly effective with the following: pentaerythritol tetra-β(4-hydroxy-3,5-di-t-butyl-phenyl propionate), 1,1,3-tri-(2-methyl-5-t-butyl-4-hydroxyphenyl) butane, 1,1-di-(2-methyl-5-t-butyl-4-hydroxyphenyl) butane, 4,4'-thio-bis-(3-methyl-6-t-butylphenol), and 2,4,6-tris(4-hydroxy-3,5-di-t-butylbenzyl) mesitylene.

The main classes of organic sulfur compounds which can be used are (1) mercaptans, thioethers and disulfides and (2) diesters of thiodialkanoic acids.

Mercaptans suitable for use in the invention include, e.g., n-hexadecyl, mecaptan, and n-octadecyl mercaptan. Typical organic thioethers and disulfides include, e.g., dilauryl sulfide, dilauryl disulfide, di-n-hexadecyl sulfide, di-n-octadecyl disulfide, and polymeric thioethers and disulfides such as polydecamethylene sulfide, polytrimethylene disulfide and polydecamethylene disulfide.

Thiodialkanoic acid diesters useful in the invention are those having the formula:

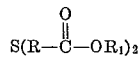

where R is an alkyl radical having about 2 to 5 carbon atoms and $R_1$ is an alkyl radical having about 10 to 20 carbon atoms. Preferred examples of this class are the thiodipropionic and thiodibutyric acid diesters such as dilauryl thiodipropionate, distearyl thiodipropionate, dilauryl thiodibutyrate, and distearyl thiodibutyrate.

For best result, a pigment grade of zinc sulfide should be used. Coarser grades of zinc sulfide should first be reduced to a relatively small particle size. The average particle size should be on the order of about 1μ with no particles greater than 25μ, and more preferably, no particles greater than about 6μ. Reduction to the desired particle size can be readily accomplished by any known method such as by ball milling, roll milling, disc milling or jet milling. Ultrasonic methods can also be used.

The zinc sulfide can be added to the polymer by known means. A preferred method is by adding fine particles thereof to the polymer and mixing in the molten state on a Banbury mixer or the like. In some cases the incorporation can be carried out in the extruder. Deposition of the additive from a dispersion in a volatile diluent is another useful alternative. The batch should be mixed well during evaporation of the diluent to insure good distribution of the additive throughout the polymer.

It will usually happen that the polymer will already be compounded with the other antioxidant and stabilizer additives as it is supplied by the manufacturer. If not, these can be added simultaneously with the zinc sulfide, employing the same methods.

In the following examples, which illustrate the invention, parts and percentages are by weight unless otherwise specified. Samples were prepared for testing by incorporating 1.5% of electrolytic grade copper powder in the polymer in a Brabender Plastograph at 190° C. under a nitrogen atmosphere, and fluxing the mixture for 3 minutes. After removing the polymeric composition from the plastograph, it was pressed flat between aluminum plates and cooled rapidly. A portion of this material was then pressed into a 10-mil sheet for 1.5 minutes at 180° C. in an electrically heated press. Samples of this sheet (0.100± 0.002 g.) were then tested in an oxygen absorption tube immersed in a constant temperature bath at 140° C., using a mercury leveling device to follow absorption of oxygen. The method is described in detail by R. H. Hansen et al., in the Journal of Polymer Science, part A, 2, 587 (1964). The end of the induction period is marked by the absorption of 1.00 ml. of oxygen, at which time the mechanical and electrical properties have failed.

EXAMPLES 1–3

Samples were prepared containing stereoregular homopolypropylene and 0.25% distearyl thiodipropionate (DSTDP), zinc sulfide at the level indicated in the table, and 0.25% 1,1,3 - tri(2 - methyl - 5 - t - butyl - 4 - hydroxyphenyl) butane, prepared by condensing 1 mole of crotonaldehyde and three moles 3-methyl-6-t-butylphenol in presence of an acid catalyst. The zinc sulfide had an average particle size of about $1\mu$, with the largest particles about $6\mu$. These samples were tested for resistance to copper-induced degradation according to the method outlined above. Test results clearly show the improved copper resistance imparted by the zinc sulfide. Test results (average of duplicate determinations) are as follows:

| Example No. | Zinc sulfide content, percent | Induction time, (hrs.) |
|---|---|---|
| Control | 0 | <20 |
| 1 | 0.25 | 115 |
| 2 | 0.5 | 175 |
| 3 | 2.0 | 240 |

EXAMPLES 4–6

The above experiments were repeated using different phenolic antioxidants in the same propylene polymer with 0.25% DSTDP. The antioxidants employed were (A) 4,4' - thiobis(3 - methyl - 6 - t - butylphenol); (B) 1,1,di-(2 - methyl - 5- t - butyl - 4 - hydroxyphenyl) butane, prepared by acid catalyzed condensation of 1 mole butyraldehyde and 2 moles 3-methyl-6-t-butylphenol; and (C) pentaerythritol tetra - β(4 - hydroxy - 3,5 - di - t - butylphenyl propionate). These formulations performed as follows:

| Example No. | Antioxidant | Percent | Percent ZnS | Induction time (hrs.) |
|---|---|---|---|---|
| Control | A | 0.25 |  | <20 |
| 4 | A | 0.25 | 0.5 | 90 |
| Control | B | 0.25 |  | <5 |
| 5 | B | 0.25 | 0.25 | 98 |
| Control | C | 0.25 |  | <5 |
| 6 | C | 0.25 | 0.25 | 400 |

EXAMPLES 7 AND 8

A copolymer of 25% ethylene and 75% propylene was formulated with 0.25% DSTDP, 0.5% zinc sulfide and the 1,1,3-tri(2-methyl-5-t-butyl-4-hydroxyphenyl) butane of Example 1, at two levels as indicated in the following table.

| Example No. | Percent antioxidant | Induction time (hrs.) |
|---|---|---|
| Control | 0.5 | <26 |
| 7 | 0.25 | 110 |
| 8 | 0.5 | 160 |

The formulations of Examples 7 and 8 were also coated on copper wire and the wire was wrapped about a mandrel about 1/16 in. in diameter, then suspended in a forced draft oven at 150° C. The samples survived for periods of 151 and 174 hours, respectively, before brittleness was noted. This compares to less than 5 hours for control samples of the same copolymer containing no zinc sulfide. Brittleness is indicated by the appearance of cracks and fissures in the surface of the coating.

EXAMPLES 9 AND 10

A random copolymer of ethylene and about 1.4% butene-1 was formulated with 0.25% DSTDP, 0.25% of 1,1,3 - tri(2 - methyl - 5 - t - butyl - 4 - hydroxyphenyl) butane and either 1 or 2% zinc sulfide and 1.4% copper dust. These specimens were subjected to the oxygen absorption test as described above except that the test was conducted at 130° C., due to the lower melting point of polyethylene. The 1% specimen failed after 340 hours and the 2% specimen after 265 hours.

A control sample of the same polymer, containing no zinc sulfide, failed after about 60 hours.

In addition to being useful in preventing degradation of olefin polymers in the presence of copper, the zinc sulfide according to this invention stabilizes the said polymers against similar degradation resulting from contact with copper alloys such as bronze. The stabilized polymers of this invention are thus useful in formulations containing copper-bronze pigments or metallized dyestuffs based on copper.

What I claim and desire to protect by Letters Patent is:

1. A composition which exhibits good resistance to oxidative degradation in the presence of copper which comprises a polymer of a mono α-olefin having 2 to 6 carbon atoms containing, based on the weight of said polymer about 0.25 to 2% zinc sulfide, about 0.25 to 2% of a phenolic antioxidant having more than one phenolic residue selected from the class consisting of 1,1,3-tri(2-methyl - 5 - t - butyl - 4 - hydroxyphenyl) butane, 1,1 - di(2-methyl - 5 - t - butyl - 4 - hydroxyphenyl) butane, pentaerythritol tetra - β(4 - hydroxy - 3,5 - di - t - butylphenyl propionate), 4,4' - thiobis(3 - methyl - 6 - t - butylphenol) and 2,4,6 - tris(4 - hydroxy - 3,5 - di - t - butylbenzyl) mesitylene, and about 0.01 to 2% of a thiodialkanoic acid diester having the formula

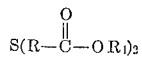

where R is an alkylene radical having about 2 to 5 carbon atoms and $R_1$ is an alkyl radical having about 10 to 20 carbon atoms.

2. The composition of claim 1 where organic sulfur compound is distearyl thiodipropionate.

3. The composition of claim 2 where the olefin polymer is selected from the class consisting of polypropylene and crystalline copolymers of propylene and up to about 25% ethylene.

4. The composition of claim 2 where the olefin polymer is selected from the class consisting of polyethylene and copolymers of ethylene and minor portions of a second α-olefin.

References Cited
UNITED STATES PATENTS

| 3,029,224 | 4/1962 | Fischer | 260—45.75 |
| 3,181,971 | 5/1965 | Rayner | 260—45.85 |
| 3,255,136 | 6/1966 | Hecter | 260—45.85 |
| 3,267,069 | 8/1966 | Cummings | 260—45.75 |

DONALD E. CZAJA, Primary Examiner

V. P. HOKE, Assistant Examiner

U.S. Cl. X.R.

117—232; 260—45.8, 45.85, 45.95